United States Patent [19]
Murray

[11] 4,266,921
[45] May 12, 1981

[54] METHOD AND APPARATUS FOR THE MANUFACTURE OF CONCRETE AND LIKE PRODUCTS

[75] Inventor: John A. Murray, Norristown, Pa.

[73] Assignee: U.S. Terrazzo Panels, Inc., Conshohocken, Pa.

[21] Appl. No.: 928,295

[22] Filed: Jul. 26, 1978

Related U.S. Application Data

[60] Division of Ser. No. 688,323, May 20, 1976; Pat. No. 4,117,060, which is a division of Ser. No. 388,558, Aug. 15, 1973, abandoned, which is a continuation-in-part of Ser. No. 336,362, Feb. 27, 1973, abandoned, which is a continuation-in-part of Ser. No. 106,364, Jan. 14, 1971, abandoned.

[51] Int. Cl.$^3$ .............................................. B28B 7/36
[52] U.S. Cl. .................................. 425/158; 425/412; 425/437; 425/815; 425/DIG. 44
[58] Field of Search ................ 264/82, 313, 86, 87, 264/316, 333, 338; 425/405 R, DIG. 44, 84, 815, 158, 437, 412

[56] References Cited

U.S. PATENT DOCUMENTS

| | | |
|---|---|---|
| 3,203,069 | 8/1965 | Wogulis . |
| 3,242,242 | 3/1966 | Bournique ..................... 264/256 X |
| 3,594,462 | 7/1971 | Vrigma ............................... 264/571 |
| 3,838,001 | 9/1974 | Greiner ............................ 425/84 X |
| 3,839,521 | 10/1974 | Robinson .............................. 264/82 |

*Primary Examiner*—Thomas P. Pavelko
*Attorney, Agent, or Firm*—Miller & Prestia

[57] ABSTRACT

A method and apparatus is provided for the manufacture of products of concrete or like construction, in which a mixture of calcareous cementitious binder substance, such as cement, an aggregate, a vinyl acetate-dibutyl maleate copolymer, and an amount of water sufficient to make a relatively dry mix is compressed into the desired configuration in a mold, and with the mixture being exposed to carbon dioxide gas in the mold, prior to the compression taking place, such that the carbon dioxide gas reacts with the ingredients to provide a hardened product in an accelerated state of cure having excellent physical properties.

4 Claims, 3 Drawing Figures

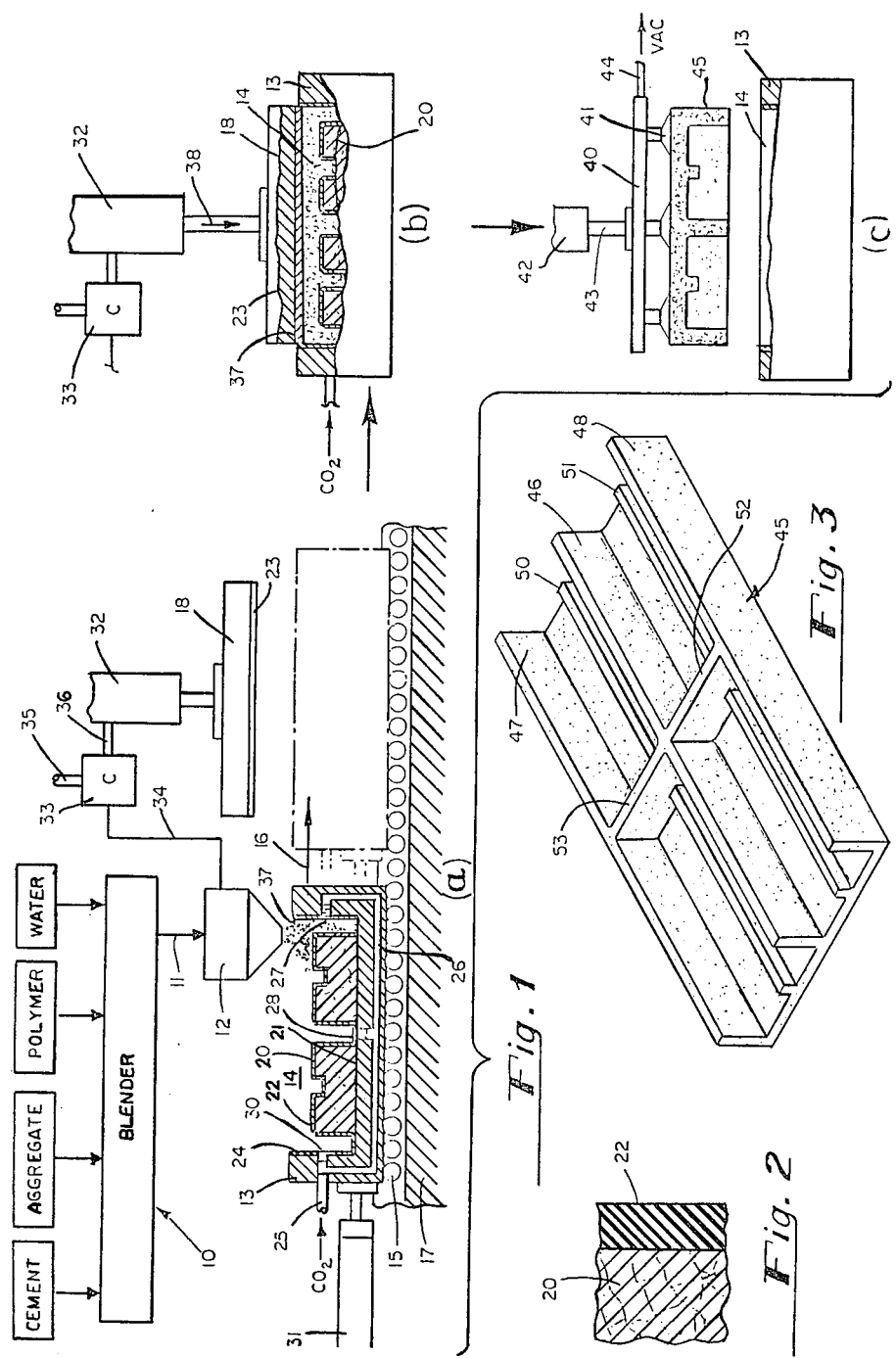

METHOD AND APPARATUS FOR THE MANUFACTURE OF CONCRETE AND LIKE PRODUCTS

CROSS-REFERENCE TO RELATED APPLICATIONS

This application is a division of Ser. No. 688,323, filed May 20, 1976, now U.S. Pat. No. 4,117,060; which is a division of Ser. No. 388,558, filed Aug. 15, 1973, now abandoned; and which is a continuation-in-part of Ser. No. 336,362, filed Feb. 27, 1973, now abandoned; which is a continuation-in-part of Ser. No. 106,364, filed Jan. 14, 1971, now abandoned.

BACKGROUND OF THE INVENTION

This invention relates to a method and apparatus for the manufacture of concrete and concrete-like products. While the invention is directed toward the manufacture of a wide and diverse range of products such as panels, including terrazzo panels, concrete blocks, cinder blocks, ceramic products, bricks, adobe constructions, concrete pipe, drainage tile, silo block or staves, pre-cast tile, filler base, pre-stressed products, and other load-bearing and non-load-bearing (curtain wall) structures, all of various sizes and shapes, the invention is most particularly directed to the manufacture of concrete and concrete-like structures that are very large in size, and intricate in configuration, such that they do not lend themselves toward conventional manufacturing techniques.

In prior art types of manufacture of concrete and concrete-like products, cement, aggregate, additives if any, and water are generally blended in various ratios. Usually, a sufficient amount of water is added to completely hydrate the cement and also to impart a degree of fluidity (substantial liquidity) to the blended mixture, to form what is often referred to as a wet mix. The blended mixture is then poured or compacted into a form and allowed to take an initial set. The initial set usually occurs within one-half hour to four hours, depending upon the temperature and mixture employed. After forming this initial set, the article usually has very little strength, and in order to increase its strength, the article is generally allowed to cure for a period of time from several days, to several weeks or more.

This excessively long period of time required for both the initial set, and for the development of its ultimate strength causes considerable problems in the manufacture of cast concrete products. Principally, the concrete mixture must remain in the mold until the product acquires sufficient strength to be self-sustaining, so that it will not fall apart when the mold is removed. This is especially so if the products or articles are to be large in size, and intricate in configuration. Furthermore, the concrete product, even after the mold is removed must be allowed to cure for an extended period of time before it is subjected to any substantial stresses. The need to maintain the concrete products in the mold until the initial set is obtained, and for curing the products until the ultimate strength is developed requires a substantial inventory of molds, and a large storage area. Also, the high costs involved in handling weak products in their initial stages of cure, in accordance with prior art processing techniques is often quite costly in both man power and storage space. Often, of even greater consequence is the cost in terms of number of rejects, or of imperfections in the products, especially as their sizes and intricacy in configuration increases. Such rejects are generally the result of imperfections due to internal stresses and even fractures that result from handling. However, such imperfections may be due to differential shrinkage characteristics at different locations of the articles or products, for example.

Attempts have been made to decrease the cure time in the manufacture of concrete and like products. Some such attempts have included the various types of accelerators that have been added to the concrete mixtures, as well as heating and steaming processes, for use during manufacture. These methods at best have produced marginal improvements with respect to reducing the curing time and have been somewhat expensive. For example, in high pressure steam curing the product often had to be steamed for twelve to twenty-four hours, in order to obtain a satisfactory hardness and strength in the final product. In addition certain of the processes had adverse effects upon the composition. High pressure steaming of concrete products containing substantial amount of marble or limestone, for example, can cause a very marked decrease in the ultimate compressive strength of the final product. Accordingly, for some compositions, such techniques are not desirable.

In order to increase the strength of concrete products, additives have previously been suggested. One patent of significance, because it teaches the use of a vinyl acetate-dibutyl maleate copolymer for improving compressive strength of articles is the Murray U.S. Pat. No. 3,305,506. It should be noted, however, that while the disclosure thereof is one that results in a beneficial effect upon improving the compressive strength of the product, the ultimate compressive strength of the product is still relatively low, compared with products made in accordance with the present invention. Furthermore, the use of such an additive is desirable with respect to the handling of smaller, preferably flat panels. However, in the manufacture of very large panels, for example, 4 Ft. by 8 Ft., and several inches, or even a foot or more in thickness, having intricate shapes, including ribs, cross ribs, etc., such as might be used in the formation of building structures, such as walls or the like, it is not possible for such an additive to give the structure sufficient strength that will enable it to stand alone, unsupported, when removed from the mold, or in most instances, even to be removed from the mold.

Some processes have been developed for curing articles produced in a mold, generally by removing the mold from the apparatus and storing it in a room for a given period of time, and wherein the article is subjected to steam and/or carbon dioxide gas within the room, for example at an elevated pressure which can facilitate the formation of a skin or surface cure thereon. However, the formation of such a cure can in itself inhibit deeper curing, by precluding further passage inward, to a deeper location, of carbon dioxide gas, for example.

THE PRESENT INVENTION

The present invention is directed to the provision of an accelerated curing process for concrete and concrete-like products, by accelerating the curing in the mold in which the ingredients are compressed, by exposure of the ingredients to carbon dioxide gas and simultaneous compression of the ingredients and gas until an advanced state of cure is obtained.

The mold cavity may have forms therein to facilitate the construction of concrete and concrete-like products having intricate shapes and may be of large size. An article thus reaching an advanced state of cure in the mold may be sufficiently self-sustaining in its shape that it can be lifted from the mold, for example, by vacuum or suction cup techniques or the like, for removal to subsequent treatment or storage stations, and preferably for early use thereafter.

Accordingly, it is a primary object of this invention to provide a novel product of concrete or concrete-like construction, having large and/or intricate configurations and being in an advanced state of cure immediately upon removal from the mold.

It is a further object of this invention to provide a novel method for making concrete and concrete-like products.

It is a further object of this invention to provide novel apparatus for making concrete and concrete-like products.

It is another object of this invention to provide an advanced state of curing of concrete and concrete-like products, within the mold which provides the shape for such products.

It is a further object of this invention to provide a novel mold and press arrangement, as well as a treatment gas delivery arrangement, with an optional formed shape pick-up.

It is another object of this invention to provide apparatus and method for rapidly producing concrete and concrete-like products, especially those of intricate shapes and large in size, wherein the products may reach an advanced state of cure at an early time, and may be discharged from the mold in substantially hardened condition at an early time.

Other objects and advantages of the present invention will become readily apparent to those skilled in the art from a reading of the following brief descriptions of the drawing figures, detailed descriptions of the preferred embodiments, and the appended claims.

The term "concrete" as it is employed in this specification, refers to a stone-like product obtained by blending a cement, aggregate such as sand, gravel, crushed stone and other like additives, and water together in appropriate amounts and allowing the mixture to harden and reach an advanced state of cure. Concrete-like is much broader, and encompasses materials having certain physical properties of concrete products, having, in some cases, substitutes for the cement normally employed in the concrete and also having, if desired, substitutes for the aggregate normally so used. They may be load-bearing or non-load-bearing and may, if desired, include the binders and/or aggregates that are selected to impart desired structural and/or decorative characteristics to the final product.

Furthermore, by way of background, it will be noted that concrete and concrete-like products continue to undergo curing for an indefinitely long period of time, perhaps thirty years or more. In this application, when reference is made to the substantially fully cured, cured, fully cured or the like products, it will be understood that what is intended is that the cure is sufficiently advanced to enable not only handling of the product, but also further movement and perhaps processing thereof, while in that state of cure, without the product breaking, crumbling or disintegrating and that curing continues over a long period of time thereafter toward a complete cure.

IN THE DRAWINGS

FIG. 1 is a schematic illustration, wherein drawing portions a, b, and c illustrate sequential stages in the manufacture of a product, in accordance with the method and apparatus of the present invention.

FIG. 2 is an enlarged fragmentary detailed view of a form utilized in the mold cavity of this invention, having a rubber-coated surface or the like.

FIG. 3 is a bottom perspective view of an especially configured concrete-like structural member, having ribs and the like therein, made in accordance with the techniques of this invention.

SUMMARY OF THE INVENTION

The present invention is directed toward providing method and apparatus, wherein calcareous cementitious binder, such as cement or other binders, an aggregate, if desired, a vinyl acetate-dibutyl maleate copolymer and a minor amount of water are blended and then disposed into a mold cavity, with carbon dioxide gas being added to the mold cavity, and with the press and mold being brought together to compress the ingredients and gas within the mold cavity during which a rapid exothermic reaction takes place wherein the ingredients undergo an advanced state of cure in a short period of time, sufficient to enable the hardening thereof into a desired shape, for removal from the mold as an integral unit, as opposed to a powdery mix, such integral unit having substantial shape-retaining characteristics and other improved physical properties, such as compressive strength.

DESCRIPTION OF THE PREFERRED EMBODIMENT

The initial step in the present invention, is the preparation of the ingredients, or starting mixture. The starting mixture is comprised of a calcareous cementitious binder, that may or may not include portland or like cements, generally an aggregate, a copolymer of vinyl-acetate and dibutyl maleate, and water. In many instances, it is desirable to utilize portland cement as the binder material. However such is not essential, depending upon the desired properties of the final article. For example, in some instances, other binders may be preferred, although in some instances, portland cement will be the preferred binder. Other calcareous cementitious materials that may be used as binders include calcareous lime, metamorphic marble dust, calcareous lime dust, calcareous fly ash, calcareous cement of various types such as white, gray, or block gray cement, aqua dust, calcareous lumnite, calcareous quick lime, all of various types. For example, when marble dust is used, various grain sizes may be used, such as finer grain sizes, coarser grain sizes, etc. In this regard, it will be noted that aqua dust is a small grain size marble dust. All of these materials contain calcium carbonate, in one form or another, in that they are all calcareous. All of these materials are available at various locations in the earth, in that they are either found in sedimentary rocks, or in metamorphic rocks, for example, at various depths within the earth, in virtually every location of the earth.

The aggregates that are used in the present invention can be selected from almost an unlimited variety of different materials. The most commonly employed aggregates for use in the present invention are sand, gravel, marble dust, marble chips, granite dust, granite chips and crushed limestone, particularly if the end product is to be a terrazzo type product. However, other types of materials which can be advantageously employed as aggregates are sea shells, broken glass, especially colored glasses, and masonry-type building rubble such as crushed concrete, mortar and crushed bricks and stone. As can be seen from the above, the choice of the particular aggregate which can be used in a method of this invention is quite extensive.

The selection of the particular aggregate is dependent upon a combination of several factors. These include the physical properties desired in the final concrete product; the decorative effect desired in the final product, and the availability and the cost of the aggregate. The particular aggregate or combination of aggregates employed has a marked effect on the ultimate strength of the concrete product. As is well known, neat cement, when mixed with water and allowed to set and cure will develop a certain minimal amount of strength. However, when an aggregate is added, the aggregate reinforces the product and results in a product having a considerably higher ultimate strength. The strength of concrete products is dependent to a large extent upon the strength of the aggregate employed, with stronger aggregates resulting in stronger concrete products.

In accordance with the present invention, in its broader aspects, the aggregate may also be selected from a group that includes ground glass, sand, calcareous limestone, clay, siliceous shale, extrusive lava, siliceous silica flour, gravel, marble, marble dust, siliceous limestone, granite, coarse grained granite, shells, quartz, aqua dust, slate, calcareous sandstone, gneise, schist, siliceous trap, and quartzite, and even metallic components, such as steel rods, brass chips, etc. and forms thereof. Of course, the aggregates may be of various sizes. These aggregates are also generally available in nature, and comprise sediments, igneous materials, sedimentary materials, and metamorphic materials. In some instances, the metamorphic materials may be either follated, and in others non-follated, and still may function as aggregates. However, when such materials are used as binders, particularly when they are marble dust, such will be of the non-follated metamorphic type. Materials used as binders need not occur as rocks in nature, but such sedimentary and metamorphic materials may take various forms.

The particle size of the aggregate or blend of aggregates employed, is likewise important. In this regard, it will be noted that various aggregates of different types may be mixed with a single binder, or with a plurality of binders, in accordance with this invention. In any event, the use of large-size aggregate particles tends to increase the strength of concrete products. However, the use of only a large particle size aggregate can result in a relatively weak product since a considerable volume of air voids will form between the aggregate particles and considerably weaken the product, in some instances. Accordingly, the use of a combination of relatively fine aggregates and coarse aggregates in the proper balance will significantly enhance the ultimate properties of the final product.

The appearance desired in the final product is another factor to consider in the selection of the aggregate, especially if a terrazzo or other aesthetically desirable product is to be produced, since the aggregate will be exposed as a result of a polishing, grinding, finishing operation or the like. In producing terrazzo, for example, marble dust is most commonly used as the fine aggregate, and marble chips are used as the coarse aggregate. The color of the marble is varied according to the effect desired in the final product. Terrazzo-like products, however, are not limited to the use of marble as the sole aggregate. Quite striking effects can be obtained with aggregate such as sea shells and broken glass which, when ground and polished, add distinctive effects to the terrazzo-like panels, as does lava (typically comprised of pumice and tepetate).

One of the more essential components of the starting mixture of this invention is a copolymer of vinyl-acetate and dibutyl maleate. This particular copolymer appears to have a dual effect in the method of this invention. Initially it makes possible rapid cure of the starting compositions to obtain the final substantially fully cured product (advanced state of curing). When the copolymer is not included in the mixture, rapid curing is not obtained in the method of this invention. Secondly, as disclosed in Murray, U.S. Pat. No. 3,305,506, the disclosure of which is herein incorporated by reference, the copolymer has a definite beneficial effect upon the strength of the product. The relative proportion of the monomers comprising the copolymer can be varied considerably and still obtain satisfactory results. The optimum results, however, have been obtained with copolymers which are comprised of about three parts by weight of the vinyl-acetate monomer and one part by weight of the dibutyl maleate monomer. A commercially available copolymer of this type is available which is comprised of about 77% by weight of vinyl acetate and about 23% by weight of dibutyl maleate prepared in emulsion form using polyvinyl alcohol as a protective colloid.

The final essential starting material for mixtures employed in the method of this invention is water. Water, as is well known to those skilled in the art is required for hydration of the oxides comprising the portland cement. This is also true with respect to the other calcareous cementitious binders employed herewith. In prior art processes, an amount of water had to be used which was at least theoretically required for a complete hydration of the oxides comprising the portland cement. In general, a considerable excess was employed in order to compensate for the amounts of water required for wetting out of the aggregate and also provide a somewhat fluid mixture to facilitate the handling of the concrete mixture. As will be pointed out below in greater detail, in the method of this invention a considerably lesser amount than the theoretical amount of water required for complete hydration is employed, and quite surprisingly, a superior product is obtained. Furthermore, in general, a considerably lesser amount of liquid, or moisture, that includes the copolymer discussed above and the water together, is employed in the practice of the present invention than the theoretical amount of water ordinarily required for complete hydration. The water used in the method of this invention does not require any particular pre-treatment, but is of the type that is ordinarily available, and which is ordinarily used to make concrete. It will further be noted that other additives may be employed, in conjunction with the practice of this invention, such as dyes, pigments, colorings and the like, either being added with the water or copolymer, or employed as parts of the aggregate utilized, or even as components of the binder that is utilized.

It will be understood that the proportions of the binders, aggregates, chemicals and water, may vary depending upon the particular substances being employed, to yield a particular end product.

It has been found that of the total amount of binder (referring to calcareous cementitious binder) and aggregate in a mix, the contribution of calcareous cementitious binder to the combination of the binder and aggregate may be as low as 6%, or as high as 100%, although the optimum, for a given end product is somewhere between those ranges. Furthermore, that binder may comprise no hydraulic cement (such as portland cement), or may be completely hydraulic cement. The variations herein will naturally affect the desired product. For example, a product that may be cured in accordance with the present invention can be constructed that may be usable for some purpose, such as for filler between outside and inside layers of building blocks, for example, but which would have very little inherent strength in and of itself. However, the product may be usable as a substance that is commonly known as filler base, which does not, in and of itself, require strength. Thus, optimum percentages will exist for the binder, for the aggregate, for the copolymer, and for the water, within the end range limits set forth herein.

Similarly, if 6% of the combination of binder and aggregate comprises binder, the remainder or 94%, would be aggregate. Conversely, no aggregate would be used if the binder is to comprise 100% of the contribution of binder and aggregate to the mix, and such mix is generally a dry mix.

Furthermore, the percentage by weight of water and vinyl acetate-dibutyl maleate copolymer together in the moist mix may vary between about 3% and as high as 20% (of the final mix of binder, aggregate, copolymer and water), although the optimum for a given desired end result, such as strength, or any other desired result will probably be somewhere between those values. Likewise, while the weight ratio of water to vinyl acetate-dibutyl maleate copolymer, in a given mix will be generally within the range of 2:1 to 4:1, an optimum weight ratio may be 3:1, for example. Obviously, certain factors, such as economics, for example, may dictate the undesirability of utilizing a moisture content of the final mix as high as 20%, but as has been set forth above, a product that is usable for some purpose can be obtainable with a moisture (copolymer and water) content that amounts to 20% by weight of the mix of binder, aggregate, copolymer and water.

For example, in the manufacture of ceramic products, of the contribution of binder and aggregate to the mix, about 18% by weight of the contribution may comprise portland cement, and about 52% of such contribution may comprise either calcareous lime, or metamorphic marble dust, for example, whereby the total percentage by weight of the binder is about 70%, with the aggregate comprising about 30% by weight of this contribution. To this combination of binder and aggregate, there would then be added sufficient moisture to bring the moisture level up to some desired level such as 6% by weight, of the total mix. This moisture may be added, for example, by premixing the dry components (that is the cement or other binder and the aggregate), so that a uniform blend is obtained prior to the addition of the liquid ingredients. Then, because of the relatively minor amount of the liquids involved, it is preferable to spray the dry mixture with a mixture of the copolymer and water. The mixing is then continued until the total mixture is uniformly blended. The above-mentioned 6% moisture is thus preferably obtained by spraying it onto the otherwise dry mix of binder and aggregate, with the moisture comprising the above-mentioned copolymer and water, in a preferred ratio of three parts water to one part copolymer, but having an acceptable range of about two parts water to one part copolymer to four parts water to one part copolymer. The copolymer itself is preferably comprised of about three parts by weight of vinyl acetate and one part by weight of dibutyl maleate.

In making a brick, the dry mix (dry mix being considered as being the mix of binder and aggregate only) may comprise, preferably, from 0% portland cement to about 46% portland cement, with the remaining binder comprising calcareous lime, calcareous cement, or calcareous fly ash, for example. The percentage of aggregate in the dry mix may preferably vary from 54% to 92%, and the particular aggregate employed may preferably be clay, siliceous shale, sand, extrusive lava, and/or siliceous silica flour, for example. The percentage of moisture in the moist mix (moist mix meaning the overall mix of binder, aggregate, copolymer and water), may vary from 3.7% to 5.2%, as a preferred range.

The composition of the moisture employed for brick, and for most other products, will be generally the same as that discussed above for ceramic products, as well as the relative distributions of components of the copolymer.

In making block, or even for example, concrete pipe, drainage tile, silo block, silo staves, concrete brick, for example, the binder employed may be calcareous lime, calcareous lime dust, calcareous fly ash, non-follated marble dust, calcareous cement, preferably being added to a given percentage of portlant cement, and mixed with an aggregate, such that the percentage of aggregate in the mix will comprise the bulk of the dry mix. However, the range of aggregate employed, once again, may vary substantially, and still provide a workable product. Similarly, the percentage of moisture in the mix (moist mix) may vary from about 3% to about 20%, preferably within the range of 3.1% to about 10%, and most preferably within the range of about 5% to 6%, based upon the weight percentage of total moisture in the moist mix.

Likewise, pre-cast tile may utilize as little as no portland cement, combined, generally, with some other binder, such as a marble dust, lime, lumnite, fly ash, etc., all calcareous in nature, in a desired percentage, with preferably some aggregate such as quartz, sand, slate, aqua dust, chips, shells, marble, etc., and with some desired percentage of moisture in the mix. It will be understood that the percentage of moisture in any mix will be influenced to some degree by the economics involved in that there is a point wherein the expense of the chemical in the mix provides a diminishing return. Conversely, there is a point wherein too little chemical in the moist mix compared to the amount of water, places limitations upon strength. This will be a more severe problem in the construction of load-bearing products, than for example, in the construction of a filler base.

In constructing a filler base product, the binder, may for example, comprise calcareous lime dust, calcareous fly ash, calcareous cement, with the addition of some portland cement, if desired, and with the aggregate comprising generally a high percentage of sand, or calcareous limestone. In the construction of a load bearing wall, for example, the binder may comprise portland cement, calcareous cement, calcareous lime dust, or a mixture of any of them, as may be the situation for any of the binders suggested herein, it being sometimes desirable to mix various types of binders, and with the aggregate employed comprising, for example, sand, gravel, marble, marble dust or the like, with some suitable percentage of moisture being added.

In the construction of a non-load bearing or curtain wall structure, for example, the binder may comprise a certain percentage of portland cement, and another percentage of other calcareous cements, such as white cement, gray cement, etc. or the like, and with the binder comprising sand, marble, or the like. Again, some suitable percentage of moisture (water and copolymer) is added thereto.

In the manufacture of pre-stressed products, again the binder may comprise calcareous cement, calcareous quick lime, portland cement, or a mixture of any of these, with a suitable aggregate such as sand, gravel, calcareous sandstone, gneise, schist, siliceous trap, calcareous limestone, non-follated marble, non-follated quartzite, intrusive granite, etc., again with some desired percentage of moisture (copolymer and water) added thereto in a desired ratio.

It is thus apparent that the present invention has applicability to an extremely wide range of products, with respect to providing an advanced state of cure. It will be apparent, however, that certain optimum conditions may preferably be employed, to yield the best results, depending upon the desired application. For example, in making a large intricately configured structure, it will generally be preferred to utilize an amount of moisture in the final mix (moisture being polymer plus water) that is substantially less than 20%, if it is desired immediately to remove the configuration from the mold upon withdrawing the press member from the mold cavity, in order that the configuration may be self-sustaining. On the other hand, if it is possible in a given instance to allow greater time for setting, it may be desirable to utilize more moist mix, depending upon the desired end use. Also, certain binders, aggregates, as well as sizes of binders and aggregates, certain compositions of the copolymer, as well as certain ratios of the various ingredients may be preferable, depending upon a desired structure to be manufactured. Also, it is generally preferable to spray the dry mix of binder and aggregate with a mixture of copolymer and water, although other methods of mixing the moisture into the dry mix may work equally as well. After the mix is uniformly blended, by continuing a mixing operation with respect thereto, the moist mixture thus obtained will appear to be relatively dry, as compared to fluid, soupy mixtures generally employed to make concrete products, in accordance with prior art techniques.

The particular type of blending apparatus employed to obtain the starting mixture is not critical, providing the starting materials are adequately blended. In the illustration of FIG. 1, for example, no particular type of blender is required. One type of blender which may be satisfactory is a turbine mixer, the delivery to which may be accomplished by a screw conveyor to provide a very complete mixture of the starting ingredients in a short period of time. Alternatively, a double screw blender could be utilized.

With particular reference to FIG. 1 in detail, it will be seen that a cement, aggregate, polymer and water are mixed in a blender generally designated by the numeral 10, and that the discharge from the blender 10 is through line 11 into a hopper 12 or the like. A mold 13 is provided having an interior cavity 14, with the mold being mounted on conveyor rollers 15 or the like, for movement therealong, in the direction of the arrow 16 illustrated in FIG. 1(a), from the full line to the phantom positions illustrated therefor. The rollers 15 may be mounted for rotation on a suitable base 17, if desired. It will be apparent that any facility may be utilized to discharge the ingredients from some container such as a hopper 12, into the mold 14, such as by effecting relative motion therebetween by means of the conveyor rollers 15, as illustrated in FIG. 1, or any alternative means may be utilized. The use of roller conveyors or the like (or even slides or the like as an option) may, however, facilitate the transportation of the mold 13 from beneath a blender 12, to a station beneath a press member 18.

It will be seen that the mold 13, being generally of steel or like construction, is provided with one or more forms 20 therein, for example on the lower surface 21 illustrated in FIG. 1(a), and with most of the surfaces of the cavity 14 (including the forms 20) being coated with a substance 22 of rubber or rubber-like construction. The forms 20 may be carved from wood, or cast from steel, or otherwise prepared, as desired. The rubber 22 may be of the natural gum rubber type, or may be a synthetic rubber, or perhaps even a plastic or the like, or any other material that will accomplish the desired ends of permitting moisture retention and regeneration within the cavity 14, and not operating as a substantial heat sink, as may be the case if the surface involved were of metallic construction, as opposed to a non-metallic rubber-like construction or the like. Similarly, the undersurface 23 of the press 18 may be coated if desired. If the sidewalls 24 are not of any substantial height, it may be possible not to coat them with a non-metallic substance such as the rubber or rubber-like material, but in the embodiment illustrated in FIG. 1(a), the configuration is such as to make a uniquely shaped article (that illustrated in FIG. 3) having ribs of substantial depth, and accordingly, the mold sidewalls 24 should preferably also be coated, in that they occupy substantial portions of the area of the interior of the mold.

It will also be noted that the mold 13 is provided with a system for delivering carbon dioxide gas through an inlet 25 thereof, through delivery lines such as 26, to various ports 27, 28, 30 and the like, that open into the mold cavity 14. It will also be noted that such ports could open through the forms 20 if desired, and their junctions with the cavity 14 could be provided with a perforated screen or the like, or even a one-way valve for each such port, if desired, to preclude their becoming clogged with ingredients. However, in many instances such will not be necessary, it being sufficient merely to blow the ports open just prior to the next usage of the mold 13, or subsequent to the last previous usage thereof, in order to clear the ports from any ingredient particles that have been retained from the next previous utilization of the mold 13.

The delivery line 25 is connected to any suitable source of carbon dioxide gas, such as tanks or the like, that are commercially available for providing essentially pure carbon dioxide gas (preferably 95% pure or better).

A hydraulic cylinder or like 31 may be provided, for laterally advancing the mold 13, to a position beneath the press member 18, if desired.

After the ingredients are disposed within the mold cavity 14, and the environment about the ingredients within the mold cavity 14 is substantially an essentially complete carbon dioxide environment (with perhaps very small amounts of air), the mold 13 is advanced from the position illustrated in full lines in FIG. 1(a) to the phantom position thereof. In some instances, it is possible to merely dispense the carbon dioxide gas into the mold cavity 14 from above, without passing it through the mold 13 as illustrated in FIG. 1(a), because the carbon dioxide gas is somewhat heavier than air that comprises the normal environment, and being heavier, will tend to fill the mold cavity 14, displacing any air originally disposed therein.

The press member 18 is cylinder-mounted, on the cylinder 32. The cylinder 32 is a high pressure hydraulic cylinder of the controlled-descent type, for carrying the press member 18 into the mold cavity 14. The cylinder 32 is a high capacity type, capable of exerting as much as a million pounds of pressure (or more if desired) per square yard on the ingredients being compressed.

At this point, the gas having been injected into the mold cavity 14, and being dispersed with the ingredients therein, such dispersion preferably being an even natural dispersion, the ingredients may perhaps commence an exothermic reaction with the carbon dioxide gas. It is very important that such reaction not be allowed to proceed too far, prior to compressing the ingredients within the mold with the press member 18, or hardness of the ingredients will not result. It is possible to compress the ingredients within the mold 14 as soon as they are disposed within the mold and the injection and dispersion of carbon dioxide gas has been completed, but a delay in such compression should not exceed a period of time that will allow ingredients within the mold 14 to exceed an exothermic temperature rise of 20° F., and preferably not to exceed an exothermic temperature rise of 16° F. to 17° F. Accordingly, if desired a suitable control box of any type, such as a timer or the like 33 may be utilized, connected to the hopper 12 by a suitable electric connection line 34, to connect a sensor disposed within the hopper 12 to the control box 33, if desired, for triggering the device 33, to actuate a valve that will permit the flow of hydraulic fluid from the line 35, to the cylinder 32, through a line 36, for effecting the controlled descent of the press member 18, and also, if desired, to control the delivery of hydraulic fluid (not shown) to the cylinder 31, if desired, to assure the desired placement of the mold 13 beneath the press member 18, when the press member 18 is brought sufficiently downwardly to engage the ingredients within the mold 13, as illustrated in FIG. 1(b). The cylinder 31 may, if desired, also be used to assure the desired placement of the mold 13 beneath the vacuum head 40 thereafter.

With reference to FIG. 1(b), it will be seen that the periphery of the lower edge of the press member 18, besides being provided with the rubber or other suitable coating 23 as aforesaid, is in very close engagement with the upper edge 37 of the mold 13, in order to effect a tight seal therewith, for capturing carbon dioxide gas and the moisture present in the ingredients within the cavity 14, when the press member 18 is in about the position illustrated in FIG. 1(b). The cylinder 32 then continues to apply the pressure, for compacting the ingredients into a solid structure, which may take about one minute, depending upon the particular relative proportions of ingredients, and during which the ingredients will undergo a further exothermic temperature rise of about 80° F., and at least of about 40° F. At this point, the control 33 will be actuated by its timer or the like (or even by a sensor) disposed within the mold cavity 14 (if desired, not shown), for withdrawing the press member 18, in an upward direction from that illustrated in FIG. 1(b) (opposite to the direction of the arrow 38 illustrated in FIG. 1(b)), by actuating the cylinder 32 in reverse manner. At this point, the ingredients filling the cavity 14 will preferably be in a self-sustaining configuration, capable of being lifted from the mold cavity 14. This step of lifting from the mold cavity 14 is illustrated in FIG. 1(c), whereby a vacuum head 40 having suction type lifting cups 41 on its lower surface is lifted by a cylinder 42 connected thereto by suitable connecting rod 43, with the cylinder 42 providing upward and downward vertical movement for the head 40, and with the head 40 being connected to a suitable vacuum source by the line 44, under a sufficient negative pressure to lift a hardened and shaped structure 45 in an advanced state of cure, as illustrated in FIG. 1(c). Thus, the plate 40 will first be lowered into contact with the shape 45, with the vacuum then being actuated to securely grip the shape 45 by the suction members 41, and with the plate 40 then being raised upwardly by actuation of the cylinder 42 or the like, to lift the shape 45 from the mold cavity 14, for deposit onto a conveyor, storage or the like, either by laterally moving the head 40, or by laterally moving the mold 13, back beneath the hopper 12, to receive ingredients for making yet another shape or the like, if desired.

It will be clear that the relative motions illustrated for the various components in FIGS. 1 (a), (b), (c) are exemplary only, and are illustrated in schematic form, it being understood that, instead of lowering a press member 18, for example, it may alternatively be desired to raise the mold member 13.

With reference to FIG. 3, it will be seen that the product or article 45 has central and end ribs 46, 47 and 48, as indicated, with short intermediate ribs 50 and 51, also longitudinally directed, with transverse ribs 52 and 53 connecting the rib 46 with the ribs 48 and 50, as well as with the shortened ribs 50 and 51, as illustrated. Such may be a typical construction for an exterior 4 Ft. by 8 Ft. outside load-bearing panel, for the formation of an outside wall of a house or the like. Typically, such a panel will be constructed of ingredients such that it will be load-bearing, and may, if desired mate with a non-load-bearing or curtain wall structure (capable of sustaining some loads, but not of amounts that would normally be considered for load-bearing structural members).

It can readily be seen, that compressing a member of the unique configuration illustrated in FIG. 3, of concrete-like-formative ingredients by conventional techniques, would normally so exert stress concentrations at the various intersections of the planar surfaces illustrated for the article 45 of FIG. 3, such that it would be impossible to remove the article 45 from the chamber 13 at an early stage. However, by effecting a substantial curing, or bringing of the article 45 to an advanced state of cure during the formation of its shape within the chamber 13, the innovative techniques of the present invention become readily apparent, with respect to the high-speed manufacture of large, intricate structural members.

It will be noted that carbon dioxide gas is an essential reactant in the process of the present invention, and that the rapid exothermic reaction necessary in order to effect an advanced state of cure as set forth herein will not be obtained with other gases such as air, oxygen, nitrogen, etc. Furthermore, the application of heat alone will not be sufficient, it being necessary to effect the exothermic action from within the ingredients (including carbon dioxide gas) themselves.

Furthermore, the presence of the vinyl-acetate dibutyl maleate copolymer in the mixture is necessary in order to obtain the rapid reaching of an advanced state of cure as set forth herein.

Furthermore, curing to the completion desired if the surfaces of the mold 22 (or at least if substantial areas of those surfaces) are of metallic construction will not be obtained, at least not to a satisfactory level. It is believed the reason that the use of non-metallic materials such as rubber or the like work, whereas metallic materials will not work if used to any substantial degree resides in the ability of metallic materials to effect a heat sink phenomena when subjected to the very cold carbon dioxide gas, thereby drawing off the heat or reaction from the ingredients with carbon dioxide gas before such reaction has a chance to reach any substantial completion.

It will also be noted that percentages expressed, as well as ratios, throughout this application are indicated in weight, not volume, unless otherwise indicated.

It will be clear that various other techniques, as well as apparatus, may be used to accomplish the desired result of the present invention, all within the spirit and scope of the invention as recited in the appended claims. For example, various sequential changes may be made with respect to movement of the mold, and hopper, relative to each other, or with respect to movement of any of the press member 18, or vacuum head 40, relative to the press member, all within the spirit and scope of the invention. It may be desirable, for example, to imbed the suction members 41 within the press member 18, if desired, or to introduce the carbon dioxide gas into the cavity 14, through the press member 18, as an alternative. All such modifications both in apparatus, and in techniques, as well as other obvious modifications, and controls therefor are to be included within the present invention, as defined in the appended claims.

What is claimed is:

1. Apparatus for forming concrete and like articles that have an advanced state of cure, comprising a mold having a mold cavity therein, said mold being devoid of any heating means and being exposed to the natural ambient temperature and adapted for receiving a blend of unheated concrete-forming or the like starting materials therein, a press member which is devoid of any heating means and exposed to the natural ambient temperature, means for effecting relative movement between the press member and the mold cavity for compacting materials in the mold under a desired force applied by said press member, means for delivering carbon dioxide gas to the interior of the mold cavity, and means for separating said press member from said mold cavity within about one minute after completion of said compaction, wherein said apparatus includes a preselected form disposed in said mold cavity about which the article-forming materials are to be disposed, said form being mounted on a surface thereof, for providing a desired configuration for the article to be formed, wherein said gas delivering means comprise delivery ducts extending through the mold and having ports thereof opening into the cavity thereof, the major surfaces of said mold, said press, and said form which engage said starting materials being constructed of non-heat sink surfaces which are adapted to substantially preserve the heat of reaction of said starting materials and said carbon dioxide gas when said starting materials are compacted, the non-heat sink surfaces of said press and said mold being adapted to form a seal when said starting material is compacted, said apparatus further comprising control means operatively associated with said means for effecting relative movement between said press member and said mold cavity, for actuating said relative movement before said blend of materials exhibits an exothermic temperature rise of about 16° F.

2. The apparatus of claim 1, wherein said major surfaces are constructed of a material having characteristics that permit moisture retention in the mold in the presence of carbon dioxide gas.

3. The apparatus of claim 1, wherein said major surfaces are constructed of a rubber or rubber-like material.

4. The apparatus of claim 1, including vacuum pickup means for withdrawing a unitary solid article thus formed and in an advanced state of cure, from the mold cavity.

* * * * *